May 21, 1963 R. F. SAYLOR 3,090,479
SPROCKET FOR ENDLESS PALLET-TYPE CONVEYOR
Filed March 16, 1961 2 Sheets-Sheet 1
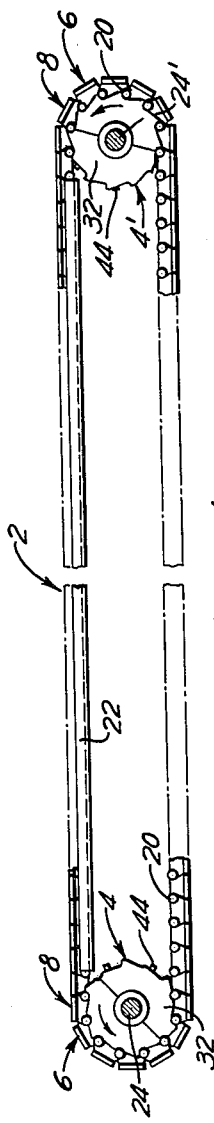
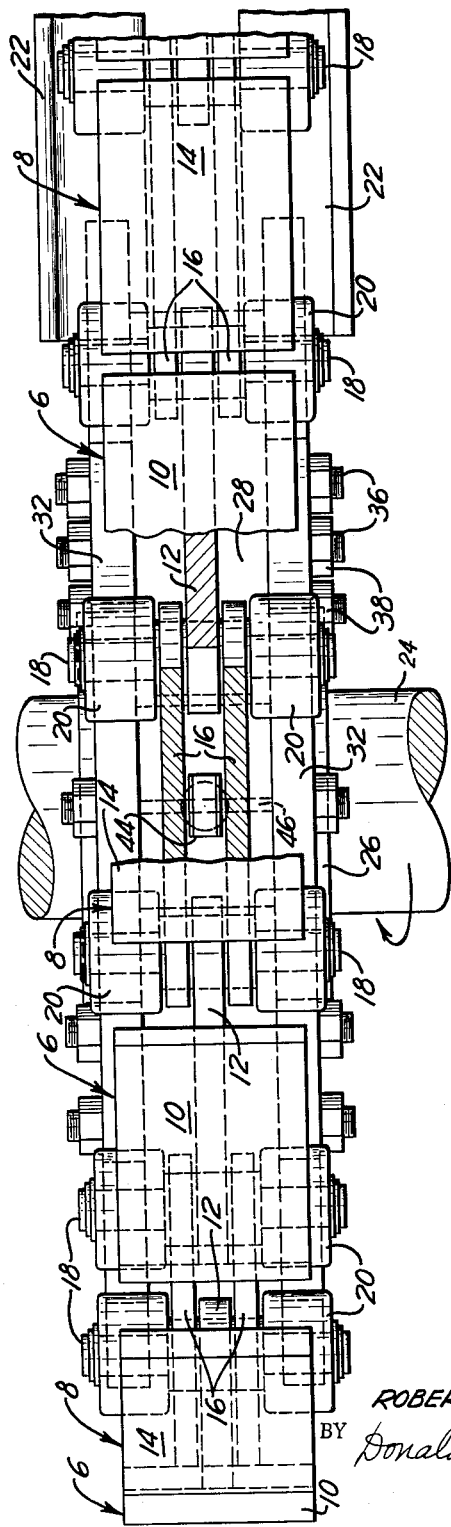
INVENTOR.
ROBERT F. SAYLOR
BY Donald G. Dalton
ATTORNEY

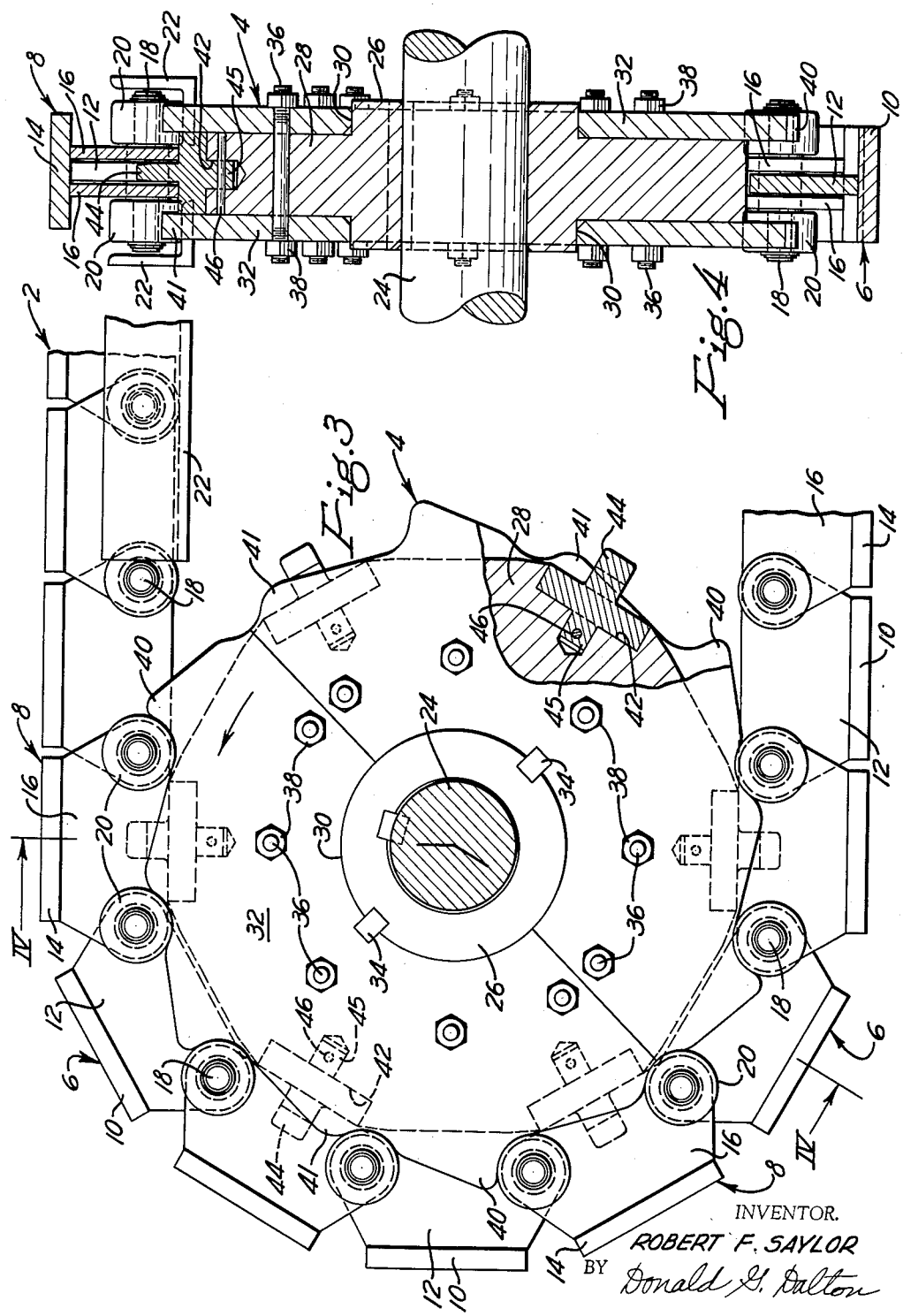

United States Patent Office 3,090,479
Patented May 21, 1963

3,090,479
SPROCKET FOR ENDLESS PALLET-TYPE CONVEYOR
Robert F. Saylor, Conemaugh Township, Somerset County, Pa., assignor to United States Steel Corporation, a corporation of New Jersey
Filed Mar. 16, 1961, Ser. No. 96,271
5 Claims. (Cl. 198—189)

The present invention relates generally to conveyors and more particularly to an improved sprocket for an endless pallet-type chain conveyor.

As is well known, endless pallet-type chain conveyors consist essentially of a series of male and female pallets arranged alternately in sequence to form an endless chain. The male pallets are each T-shaped in cross-section and include a load-bearing surface having a center flange member depending normal therefrom and extending beyond both ends thereof. The female pallet is similar to the male pallet except that a pair of spaced flanges depend from the load-bearing surface of the female pallet and form a recess for receiving the end of the flange of the male pallet. The chain is formed by pivotally interlocking the flange of each male pallet in the recess formed by the two flanges of the adjacent female pallet. The flanges are interlocked by means of a transverse shaft which is rotatably fitted through the interlocking portions of the male and female pallets with its ends projecting laterally therefrom. A roller is rotatably mounted on each of the projecting ends of each of the shafts for supporting the pallets. A trackway for the rollers is provided extending subjacent and coextensive with the upper flight of the conveyor.

Prior to my invention the pallet-type chain conveyor was driven by means of a pair of sprockets, one keyed to a driven shaft adjacent each end of the trackway. The sprockets were positioned tangential with the trackway and the chain was trained around the sprockets. Each of the sprockets was formed with a series of hardened sprocket teeth spaced circumferentially therearound.

In operation, as the sprockets were rotated, the sprocket teeth thereon would sequentially enter the recess formed by the two flanges of each of the female pallets and engage the flange of the male pallet connected with the forward end of the female pallet and thus drive the conveyor. Since each sprocket tooth was arranged to engage the male pallet flange while within the recess on the underside of the female pallet adjacent thereto, the sprocket teeth also served as guides to prevent lateral displacement of the chain while it traveled around the sprocket.

The sprocket arrangement just described did not prove satisfactory in that the frictional engagement of the hardened sprocket teeth on the flanges of the male pallets always occurred on the same area of the flanges and caused the male pallets to wear in a relatively short time.

It is accordingly, the primary object of my invention to provide for endless pallet-type chain conveyors an improved sprocket having sprocket teeth thereon arranged to sequentially engage the rollers of the pallets to drive the conveyor.

It is another object of my invention to provide for endless pallet-type chain conveyors an improved sprocket as set forth by the above object including guide projections spaced around the perimeter of the sprocket circumferentially offset from the sprocket teeth for coaction with the female pallets of the chain to prevent lateral displacement thereof.

These and other objects will become more apparent after referring to the following specification and attached drawings, in which:

FIGURE 1 is a side elevational view partially diagrammatic of an endless pallet-type chain conveyor having sprockets in accordance with the invention;

FIGURE 2 is an enlarged top plan view of the left end of the conveyor shown in FIGURE 1 with a portion broken away for clarity;

FIGURE 3 is a side elevational view of FIGURE 2 with a portion broken away for clarity; and FIGURE 4 is a sectional view taken along the line IV—IV of FIGURE 3.

Referring more particularly to the drawings reference numeral 2 designates generally an endless pallet-type chain conveyor having sprockets 4 and 4' of the invention incorporated therein. As shown in FIGURE 1, sprocket 4 is the driving sprocket and sprocket 4' which is disposed oppositely of sprocket 4 is the idler sprocket. Sprocket 4 rotates in counterclockwise direction to effect travel of the upper flight of the conveyor to the left. The conveyor 2 includes a series of male pallets 6 and female pallets 8 arranged alternately in sequence to form an endless chain. Each of the male pallets is substantially T-shape in cross-section and includes a load-bearing surface or platform 10 having a flange 12 depending normal from the underside thereof and extending beyond the ends of the load-bearing surface 10. Each of the female pallets includes a load-bearing surface or platform 14 having a pair of spaced flanges 16 depending from the underside thereof. The recess between the flanges of the female pallet is dimensioned to receive the end of the male pallet and a guide projection which will be further described hereinafter. The pallets of the chain are pivotally interlocked with the projecting end of the flange of each of the male pallets disposed between the flanges of the adjacent female pallet. The pivotal interlock is achieved by means of a transverse shaft 18 which is rotatably fitted through the interlocking projections of the male and female pallet flanges and has ends projecting laterally from the flanges, as best shown in FIGURE 2. A freely rotatable roller 20 is mounted on the projecting end of each of the shafts 18. A trackway 22 is disposed subjacent and coextensive with the upper flight of the conveyor for supporting the rollers 20.

The construction just described is conventional with the exception of the sprocket of my invention the details of which will now be described.

Sprocket 4 keyed to a shaft 24 is disposed adjacent the forward end of the trackway 22 and sprocket 4' keyed to a freely rotatable shaft 24' is disposed adjacent the rearward end of the trackway. Shaft 24 is connected by suitable means to a drive motor (not shown). Sprocket 4 is the driving sprocket and rotates in counterclockwise direction to effect travel of the upper flight of the conveyor to the left as viewed in FIGURE 1. Sprocket 4', which is not driven but is free to rotate with shaft 24', functions as an idler sprocket. It will be noted that if desired, suitable clutch connections (not shown) may be provided whereby shaft 24 can be disengaged from its drive motor and be made freely rotatable, and shaft 24' can be connected with a drive motor so that sprocket 4' will be rotated in clockwise direction to effect movement of the upper flight of the conveyor to the right as viewed in FIGURE 1. Sprockets 4 and 4' are identical in structure, therefore only sprocket 4 will be shown and described in detail.

Sprocket 4 is positioned tangentially relative to the trackway 22 and includes a hub 26 having an enlarged diameter center portion 28 which forms shoulders 30 at each end of the hub. A disc 32 is fitted snugly on each of the shoulders 30 and keyed thereto by keys 34. The keys 34 prevent relative rotation between the hub and the discs. A plurality of circumferentially spaced bolts 36 extend transversely through the discs and the center portion of the hub and, with nuts 38, serve to secure the assembly of hub and discs together.

The perimeter of each of the discs 32 is formed with a series of spaced, driving sprocket teeth 40 extending circumferentially therearound. The discs 32 are arranged so that the sprocket teeth of one disc are aligned with the sprocket teeth of the other. Teeth 41 are also formed on the perimeter of each of the discs arranged alternately with teeth 40. Teeth 41 are shorter than teeth 40 and function as locating means to assist in stabilizing the pallet chain as it moves around the sprockets.

The enlarged diameter center portion 28 of the hub 26 is formed with sockets 42 spaced circumferentially therearound for receiving radially extending guide projections 44. Each guide projection is removably mounted in its respective socket by means of a dowel 45, which may be welded or otherwise secured to the bottom of the guide projection, and a dowel pin 46, as best shown in FIGURES 3 and 4.

The continuous chain formed by the pallets 6 and 8 is trained around the sprockets 4 at each end of the trackway 22. The sprocket teeth 40 and the pallet chain are so arranged that the teeth engage the pair of rollers 20 at the forward end of each of the male pallets as the pallets travel around the sprocket when the shaft 24 is rotated in the direction indicated by the arrow in FIGURES 1, 2 and 3 to drive the conveyor. As the conveyor is so driven, the guide projections 44 enter between the flanges 16 of the female pallets sequentially and move with them as they travel around the sprocket. Thus, the teeth 40 drive the conveyor and the guide projections 44 prevent lateral displacement of the chain as it is being driven by the sprocket teeth. Since the driving sprocket teeth engage only the freely rotatable rollers of the pallet chain to drive the conveyor, wear of the engaging parts is minimized.

If desired, the sprocket discs 32 can be made in two or more sections for purposes of economy or convenience. Although I have shown the teeth 40 formed integral with the discs 32, it will be noted that the teeth can be preformed and then welded or otherwise secured to the discs. Also, the number of teeth on the discs 32 may be varied in accordance with the requirements of any particular installation.

While one embodiment of my invention has been shown and described, it will be apparent that other adaptations and modifications may be made without departing from the scope of the following claims.

I claim:

1. In an endless conveyor including an endless chain made up of alternately arranged male and female pallets, each of said male pallets including a load-bearing surface and a flange projecting normal to said load-bearing surface, each of said female pallets including a load-bearing surface and a pair of spaced flanges projecting normal to said load-bearing surface, said flange and said pair of flanges being pivotally interconnected at the adjacent ends of said male and female pallets, a pair of supporting rollers rotatably mounted on each of said interconnected sets of flanges, and a trackway for supporting said rollers, the improvement therewith of a transversely extending rotatable shaft mounted adjacent each end of said trackway, a sprocket fixedly mounted on each of said shafts tangential with said trackway, said endless chain being trained around said sprockets, a first series of spaced sprocket teeth extending radially from each of said sprockets, a second series of spaced sprocket teeth extending radially from each of said sprockets, the sprocket teeth of said second series being shorter than and arranged alternately with the teeth in said first series, said sprocket teeth being adapted to engage said pairs of rollers sequentially upon rotation of said sprockets, and means for driving one of said shafts to rotate one of said sprockets and thereby engage said rollers with said sprocket teeth to drive said conveyor.

2. In an endless conveyor the improvement therewith as defined by claim 1 including a plurality of spaced radially extending guide projections on each of said sprockets one disposed between each pair of said sprocket teeth in said first series, said guide projections being adapted to enter between the flanges projecting from the load-bearing surface of each female pallet as it passes over said sprockets.

3. In an endless conveyor including an endless chain made up of alternately arranged male and female pallets, each of said male pallets including a load-bearing surface and a flange projecting normal to said load-bearing surface, each of said female pallets including a load-bearing surface and a pair of spaced flanges projecting normal to said load-bearing surface, said flange and said pair of flanges being pivotally interconnected at the adjacent ends of said male and female pallets, a pair of supporting rollers rotatably mounted on each of said interconnecting sets of flanges, and a trackway for supporting said rollers, the improvement therewith of a transversely extending rotatable shaft mounted adjacent each end of said trackway, a sprocket fixedly mounted on each of said shafts tangential with said trackway, said endless chain being trained around said sprockets, each of said sprockets including a hub, a pair of spaced discs mounted on said hub for rotation therewith, a first series of radially projecting sprocket teeth spaced around the perimeter of each of said discs, a second series of radially projecting sprocket teeth spaced around the perimeter of each of said discs, the sprocket teeth of said second series being shorter than and arranged alternately with the teeth in said first series on each of said discs, the sprocket teeth on one of said discs being aligned with the sprocket teeth on the other disc, the sprocket teeth on said discs being adapted to sequentially engage said pairs of rollers upon rotation of said sprockets, and means for driving one of said shafts to rotate one of said sprockets and thereby engage said rollers with said sprocket teeth to drive said conveyor.

4. In an endless conveyor the improvement therewith as defined by claim 3 including a series of radially extending guide projections spaced around the perimeter of each of said hubs between the discs thereon, said series of guide projections being circumferentially offset from the first series of sprocket teeth on said discs, said guide projections each being adapted to enter between the flanges of each of said female pallets as it passes around said sprockets.

5. In an endless conveyor the improvement therewith as defined by claim 4 characterized by each of said hubs having sockets spaced circumferentially of its periphery, and said guide projections being removably seated in said sockets.

References Cited in the file of this patent

FOREIGN PATENTS 182,352     Austria _____ June 25, 1955